US011676574B2

(12) United States Patent
Rakshit et al.

(10) Patent No.: US 11,676,574 B2
(45) Date of Patent: Jun. 13, 2023

(54) DURATION BASED TASK MONITORING OF ARTIFICIAL INTELLIGENCE VOICE RESPONSE SYSTEMS

(71) Applicant: INTERNATIONAL BUSINESS MACHINES CORPORATION, Armonk, NY (US)

(72) Inventors: Sarbajit K. Rakshit, Kolkata (IN); Shikhar Kwatra, San Jose, CA (US); Zachary A. Silverstein, Jacksonville, FL (US); Martin G. Keen, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 16/948,146

(22) Filed: Sep. 4, 2020

(65) Prior Publication Data

US 2022/0076661 A1 Mar. 10, 2022

(51) Int. Cl.
*G10L 15/00* (2013.01)
*G10L 15/22* (2006.01)
*G10L 15/06* (2013.01)
*G06N 20/00* (2019.01)
*G10L 15/30* (2013.01)
*G06N 5/04* (2023.01)

(52) U.S. Cl.
CPC ............ *G10L 15/063* (2013.01); *G06N 5/04* (2013.01); *G06N 20/00* (2019.01); *G10L 15/22* (2013.01); *G10L 15/30* (2013.01); *G10L 2015/223* (2013.01)

(58) Field of Classification Search
USPC ............... 382/141–153, 100–103, 155–157; 704/200–275
See application file for complete search history.

(56) References Cited

U.S. PATENT DOCUMENTS

| 7,931,563 B2 | 4/2011 | Shaw |
| 8,924,334 B2 | 12/2014 | Lacey |
| 10,002,259 B1 | 6/2018 | Mai |
| 2012/0225413 A1* | 9/2012 | Kotranza ............... G09B 23/30 434/262 |
| 2016/0180222 A1 | 6/2016 | Sierhuis |
| 2017/0311261 A1 | 10/2017 | Mozer |
| 2018/0001205 A1 | 1/2018 | Osman |

(Continued)

OTHER PUBLICATIONS

Coen, et al., "A Context Sensitive Natural Language Modality for an Intelligent Room,", ResearchGate, Apr. 2003, 13 pages Retrieved from the Internet: <URL: https://www.researchgate.net/publication/2562239_A_Context_Sensitive_Natural_Language_Modality_for_an_Intelligent_Room>.

(Continued)

*Primary Examiner* — Marcellus J Augustin
(74) *Attorney, Agent, or Firm* — Elliot J. Shine

(57) ABSTRACT

A method, computer system, and a computer program product for task monitoring is provided. The present invention may include training an AI voice response system based on task performance data, wherein the task performance data originates from at least one monitoring device. The present invention may include receiving a request for instructions to complete a task from a user. The present invention may include monitoring a performance of the task by the user, wherein the performance of the task by the user is monitored utilizing at least one monitoring device. The present invention may include determining differences between the performance of the task by the user and a task sequence.

17 Claims, 5 Drawing Sheets

(56) References Cited

U.S. PATENT DOCUMENTS

| | | | | |
|---|---|---|---|---|
| 2020/0043355 | A1* | 2/2020 | Kwatra | G06Q 50/20 |
| 2020/0320975 | A1* | 10/2020 | Spata | G10L 15/22 |
| 2021/0035022 | A1* | 2/2021 | Cai | G06N 20/00 |
| 2021/0192972 | A1* | 6/2021 | Acharya | G06V 30/274 |
| 2021/0209440 | A1* | 7/2021 | Rakshit | G06N 3/004 |
| 2021/0399911 | A1* | 12/2021 | Jorasch | H04L 65/403 |
| 2021/0401516 | A1* | 12/2021 | Hanuschik | G16H 20/40 |
| 2023/0031545 | A1* | 2/2023 | Oleynik | B25J 9/0087 |

OTHER PUBLICATIONS

Mell, et al., "The NIST Definition of Cloud Computing", National Institute of Standards and Technology, Special Publication 800-145, Sep. 2011, 7 pages.

Ramasamy Ramamurthy, et al. "Recent trends in machine learning for human activity recognition—A survey," WIREs Data Mining Knowledge Discovery, Mar. 2018, 11 pages., vol. 8, E. 1254, DOI: 10.1002/widm.1254, Retrieved from the Internet: <URL: https://onlinelibrary.wiley.com/doi/abs/10.1002/widm.1254>.

Stevens, "Amazon's New Echo Device Will Be Watching," Fox Business News, May 11, 2017. [accessed Dec. 8, 2017], 2 pages, Retrieved from the Internet: <URL: http://www.foxbusiness.com/features/2017/05/11/amazons-new-echo-device-will-be-watching.html>.

Sun, "Contextual Intent Tracking for Personal Assistants," KDD '16: Proceedings of the 22nd ACM SIGKDD International Conference on Knowledge Discovery and Data Mining, Aug. 2016, pp. 273-282, Retrieved from the Internet: DOI: 10.1145/2939672.2939676, <URL: https://doi.org/10.1145/2939672.2939676>.

\* cited by examiner

DURATION BASED TASK MONITORING OF ARTIFICIAL INTELLIGENCE VOICE RESPONSE SYSTEMS

BACKGROUND

The present invention relates generally to the field of computing, and more particularly to Artificial Intelligence (AI) voice response systems.

The global AI voice response market has seen continuous growth. AI voice response systems may assist users with a wide array of tasks. Tasks may include setting an alarm or checking the weather but may also involve more complicated tasks that require a user to perform a series of steps to complete the task. AI voice response systems may be awakened using a voice trigger command which may be followed by a user's voice command.

Some tasks, due to their extensive task sequence, may require continual interactions between a user and the AI voice response system. This may require multiple voice trigger commands for a single task before the task's completion.

SUMMARY

Embodiments of the present invention disclose a method, computer system, and a computer program product for task monitoring. The present invention may include training an AI voice response system based on task performance data, wherein the task performance data originates from at least one monitoring device. The present invention may include receiving a request for instructions to complete a task from a user. The present invention may include monitoring a performance of the task by the user, wherein the performance of the task by the user is monitored utilizing at least one monitoring device. The present invention may include determining differences between the performance of the task by the user and a task sequence.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
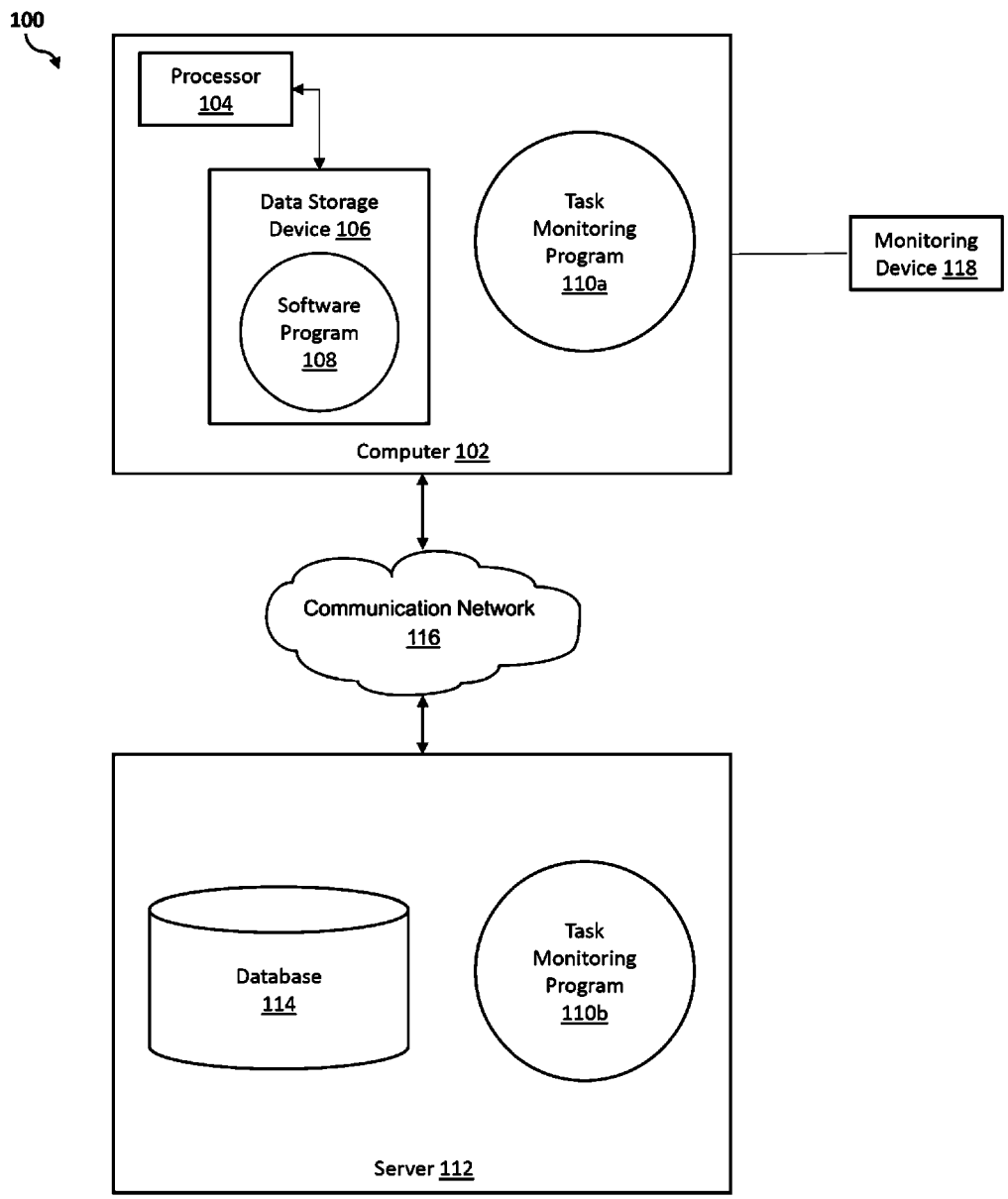
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described example embodiments provide a system, method and program product for AI voice response systems. As such, the present embodiment has the capacity to improve the technical field of task monitoring by actively monitoring a user's task performance and interrupting when the user deviates from a task sequence. More specifically the present invention may include training an AI voice response system based on task performance data, wherein the task performance data originates from at least one monitoring device. The present invention may include receiving a request for instructions to complete a task from a user. The present invention may include monitoring a performance of the task by the user, wherein the performance of the task by the user is monitored utilizing at least one monitoring device. The present invention may include determining differences between the performance of the task by the user and a task sequence.

As described previously, the global AI voice response market has seen continuous growth. AI voice response systems may assist users with a wide array of tasks. Tasks may include setting an alarm or checking the weather but may also involve more complicated tasks that require a user to perform a series of steps to complete the task. AI voice response systems may be awakened using a voice trigger command which may be followed by a user's voice command.

Some tasks, due to their extensive task sequence, may require continual interactions between a user and the AI voice response system. This may require multiple voice trigger commands for a single task before the task's completion.

Therefore, it may be advantageous to, among other things, train the AI voice response system based on task performance data, receive a request for instructions to complete a task from a user, monitor a performance of the task by the user, and determine differences between the performance of the task by the user and a task sequence.

According to at least one embodiment, the effectiveness of AI voice response systems may be seen by connecting the AI voice response system to at least one monitoring device. Utilizing the at least one monitoring device to monitor the performance of the task by the user may be useful in helping the user avoid mistakes while performing the task.

According to at least one embodiment, the present invention may actively monitor the performance of the task by the user. This may be helpful for long tasks in not requiring the user to utilize multiple voice trigger commands.

According to at least one embodiment, the present invention may train the AI voice response model based on task performance data. Training the AI voice response system based on the task performance data may improve the AI voice response system's ability to answer user inquiries.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a task monitoring program 110a. The networked computer environment 100 may also include a server 112 that is enabled to run a task monitoring program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The monitoring device 118 is depicted as shown as its own separate entity but could be part of any other part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the task monitoring program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the task monitoring program 110a, 110b (respectively) to train an AI voice response system to actively monitor the task performance of a user. The task monitoring method is explained in more detail below with respect to FIG. 2.

Figure 2:
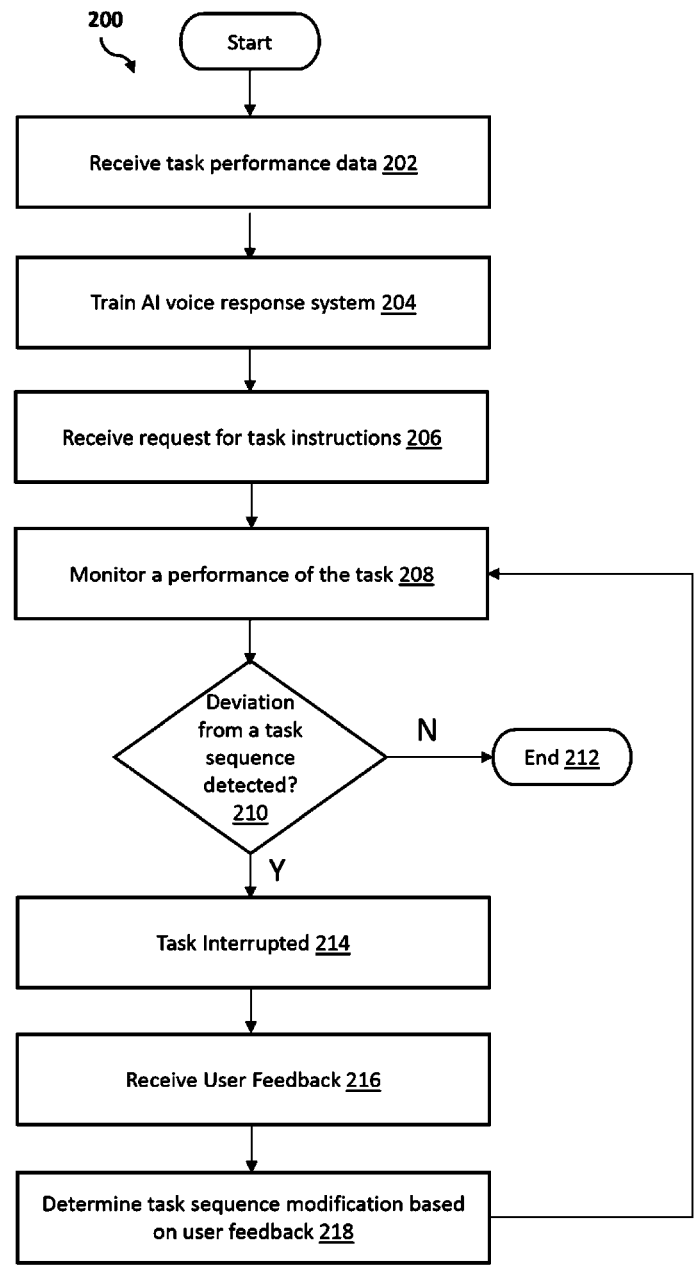
FIG. 2 is an operational flowchart illustrating a process for task monitoring according to at least one embodiment.

Referring now to FIG. 2, an operational flowchart illustrating the exemplary task monitoring process 200 used by the task monitoring program 110a and 110b (hereinafter referred to as the task monitoring program 110) according to at least one embodiment is depicted.

At 202, the task monitoring program 110 receives, by an AI voice response system, task performance data from at least one monitoring device and stores the received task performance data in a knowledge corpus. The monitoring devices 118 (e.g., connected monitoring device) may include, but are not limited to, Internet of Things (IoT) devices (e.g., mobile devices, wearable devices, smart watches) and cameras. The AI voice response system (e.g., Alexa® (Alexa and all Alexa-based trademarks are trademarks or registered trademarks of Amazon Technologies Incorporation n the United States, and/or other countries), Siri® (Siri and all Siri-based trademarks are trademarks or registered trademarks of Apple Incorporation in the United States, and/or other countries), Google Home™ (Google Home and all Google Home-based trademarks are trade-marks or registered trademarks of Google Limited Liability Company in the United States, and/or other countries), Cortana® (Cortana and all Cortina-based trademarks are trademarks or registered trademarks of Microsoft Corporation in the United States, and/or other countries), Watson™ (Watson and all Watson-based trademarks are trademarks or registered trademarks of International Business Machines Corporation in the United States, and/or other countries), and/or any other virtual assistant now known or hereinafter developed) may be connected to the monitoring devices 118 using a communication network (e.g., communication network 116, Machine-to-Machine communication (M2M)) so that a task, and a user's performance of the task, may be monitored. The task, and the user's performance of the task, may be monitored in real time. The communication network (e.g., communication network 116, M2M) may utilize a communication protocol. The communication protocols may include, but are not limited to including, Message Queuing Telemetry Transport (MQTT) Bluetooth® (Bluetooth and all Bluetooth-based trademarks and logos are trademarks or registered trademarks of Bluetooth SIG, Inc. and/or its affiliates) based piconet, and/or Scatternet network.

At 204, the task monitoring program 110 trains the AI voice response system. The task monitoring program 110 may deploy one or more machine learning models (e.g., neural net model) to train the AI voice response system (e.g., Alexa®, Siri®, Google Home™, Cortana®, Watson™, and/or any other virtual assistant now known or hereinafter developed). The machine learning model (e.g., neural net model) may train the AI voice response system based on the received task performance data (e.g., data received from the one or more monitoring devices, task performance data stored in the knowledge corpus, data from monitoring the performance of the task by the user). The machine learning model may train the AI voice response system based on task performance data received by other users (e.g., task performance data received by other AI voice response systems stored in the knowledge corpus). The task monitoring program 110 may store the received task performance data in a knowledge corpus (e.g., database 114). The knowledge corpus (e.g., database 114) may receive task performance data in real time. Task performance data may include, but is not limited to including, a previously performed task sequence, images from other task performances, task instructions accessed from the Internet, images, video, user feedback, details relating to task implementation, health monitoring data.

The task monitoring program 110 may deploy a recurrent neural network (RNN) and a convolutional neural network (CNN) to train the AI voice response system. The RNN may be a Long-short term memory (LSTM) machine learning model. The LSTM machine learning model may be a Gated recurrent unit (GRUs).

A LSTM machine learning model may be an artificial RNN architecture used in the field of deep learning. Unlike standard feedforward neural networks, LSTM may have feedback connections. LSTM may only process single data points (e.g., images), but may also process entire sequences of data (e.g., speech, video). A common LSTM unit may be composed of a cell, an input gate, an output gate and a forget gate. GRUs may be a gating mechanism in RNNs. The GRU may be similar to a LSTM with a forget gate but with fewer parameters than LSTM, as the GRU lacks an output gate.

At 206, the AI voice response system receives a request for instructions to complete a task. The AI voice response system (hereinafter the AI voice response system is trained, as described previously at step 204) may receive the request for instructions to complete the task (i.e., task instructions) from a user. The user may utilize a voice trigger command (e.g., Alexa®, Siri®, Hey Google, Cortana®, Watson™, and/or any other virtual assistant voice trigger command) to awaken the AI voice response system (e.g., Alexa®, Siri®, Google Home™, Cortana®, Watson™, and/or any other virtual assistant now known or hereinafter developed). The task instructions may be accessed from the Internet. The task instructions may be accessed from the knowledge corpus. The AI voice response system may provide task instructions in the form of a task sequence. The task sequence may be a series of steps the user is to perform in order to complete the task.

For example, the task sequence for baking a pizza (e.g., the task) may include six steps: 1) roll dough into a circle, 2) pre-heat oven to 450 degrees Fahrenheit, 3) put on pizza sauce, 4) add cheese, 5) place pizza in the oven, and 6) remove pizza from oven after 30 minutes.

The task monitoring program 110 may be able to analyze a task performance from the Internet and determine the correlating task sequence. For example, the user may request instructions by saying, "[Voice trigger command], how did the chef prepare chicken on the Food Network® last night?" (Food Network and all Food Network-based trademarks are trademarks or registered trademarks of Television Food Network, G.P. in the United States, and/or other countries). The task monitoring program may determine the request may not be stored in the knowledge corpus. The task monitoring program 110 may access the video of the chef preparing chicken on the cooking network last night and determine the task sequence based on the accessed video.

The task monitoring program 110 may utilize a task performance from the Internet (e.g., video, images, recipe listings, workout videos) to train the AI voice response system.

At 208, the AI voice response system monitors a performance of the task by the user. The AI voice response system may monitor the performance of the task by the user utilizing at least one monitoring device (e.g., connected monitoring device). The AI voice response system may actively monitor the task performance. Actively monitor may mean that the user will only utilize the voice trigger command (e.g., Alexa®, Siri®, Hey Google, Cortana®, Watson™, and/or any other virtual assistant voice trigger command) to awaken the AI voice response system (e.g., Alexa®, Siri®, Google Home™, Cortana®, Watson™, and/or any other virtual assistant now known or hereinafter developed). Actively monitor may mean that the AI voice response system monitors the user until the task is complete (e.g., until the last step of the task sequence is performed by the user).

The AI voice response system may utilize data received from the monitoring devices 118 (e.g., task performance data) to actively monitor the performance of the task by the user. Data received from the monitoring devices 118 (e.g., task performance data) may include, but is not limited to including, images, video, heart rate, voice recordings, user feedback, motion detection. The AI voice response system may identify the current step of the task sequence being performed by the user from the data received from the monitoring devices 118 (e.g., task performance data).

Data received from the monitoring devices 118 (e.g., task performance data) may be stored in the knowledge corpus (e.g., database 114). The task monitoring program may utilize task performance data to re-train the AI voice response system.

Continuing with the above example, the AI voice response system may receive video of the user putting on pizza sauce from the monitoring device (e.g., IoT devices, camera). The AI voice response system may identify that the user is currently putting on pizza sauce (e.g., performing step 3) and expects the user to add cheese next (e.g., perform step 4).

The AI voice response system may receive data from the monitoring devices in real time (e.g., a live feed). The task monitoring program 110 may store the task performance data in the knowledge corpus (e.g., database 114) in real time.

The AI voice response system may receive data of the user's performance of the task (e.g., task performance data) from the monitoring devices in increments (e.g., the data may be intermittently validated). The length of time between increments may be pre-determined (e.g., every 5 seconds). The task monitoring program 110 may determine the length of time between increments based on the task being performed by the user.

The task monitoring program 110 may utilize the knowledge corpus (e.g., database 114) to receive task performance data (e.g., task sequences, user task performances, task performances accessed on the internet, correlating images and video to steps of task sequences) and may store the task performance data in the knowledge corpus (e.g., database 114). The knowledge corpus (e.g., database 114) may receive and store task performance data from multiple users (e.g., users utilizing different AI voice response systems). The knowledge corpus (e.g., database 114) may utilize a cloud server to store the task performance data.

The task monitoring program 110 may utilize the task performance data stored in the knowledge corpus (e.g., database 114) to re-train the AI voice response system following a completion of the task.

At 210, the task monitoring program 110 determines whether the performance of the task by the user has deviated from the task sequence. If the task monitoring program 110 determines the performance of the task by the user has not deviated from the task sequence, then the task monitoring program 110 proceeds to step 212. If the task monitoring program 110 determines the performance of the task by the user has deviated from the task sequence, then the task monitoring program 110 proceeds to step 214.

If, at 210, the task monitoring program 110 determined that the performance of the task by the user did not deviate from the task sequence, then at 212, the task monitoring program 110 ends. The task monitoring program 110 will automatically cease monitoring the performance of the task by the user following completion of a last step of the task sequence (e.g., step 6, remove pizza from oven after 30 minutes).

However, the task monitoring program 110 may be capable of monitoring one or more tasks simultaneously. The task monitoring program 110 may utilize data received from the monitoring devices (e.g., task performance data) to determine the user is switching from the task previously being completed to a simultaneous task. The task monitoring program 110 may utilize the AI voice response system to confirm the user is switching from the task previously being completed to the simultaneous task.

In this instance, the task monitoring program 110 may utilize data stored in the knowledge corpus (e.g., stored data) to identify the simultaneous task. The task monitoring program 110 may utilize the AI voice response system to interrupt the user and inquire as to whether the simultaneous task should be monitored. The task monitoring program 110 may utilize the AI voice response system to receive user feedback on either task without the AI voice response system first receiving the voice trigger command.

If the task monitoring program 110 receives feedback from the user indicating the task monitoring program 110 should not monitor the simultaneous task, then the task monitoring program 110 may ignore the simultaneous task. Ignoring the simultaneous task may include, but is not limited to including, the task monitoring program 110 directing the monitoring devices to monitor only the task being completed, and not the simultaneous task (e.g., by narrowing a camera view to only capture the task being completed and not the simultaneous task), the task monitoring program 110 blocking data received from the monitoring devices relating to the simultaneous task, and/or the task monitoring program 110 not storing data received from the monitoring devices relating to the simultaneous task in the knowledge corpus.

For example, the task monitoring program 110 may direct a camera to only monitor the dough for the task of the user making a pizza and to ignore the simultaneous task of the user preparing lemonade.

If, at 210, the task monitoring program 110 determined that the performance of the task by the user deviated from the task sequence, then at 214, the task monitoring program 110 interrupts the user. The task monitoring program 110 may determine the performance of the task by the user has deviated from the task sequence based on the task performance data received from the user's monitoring devices (e.g., collectively determined to be task performance data). The task monitoring program 110 may utilize the AI voice response system to interrupt the user. The task monitoring program 110 may utilize a microphone or any other mode of communication the user may specify (e.g., microphone of the AI voice response system, message alert to mobile phone, vibration on a wearable device). The AI voice response system may interrupt without first receiving the voice trigger command (e.g., Alexa®, Siri®, Hey Google, Cortana®, Watson™, and/or any other virtual assistant voice trigger command).

The task monitoring program 110 may utilize the monitoring device to interrupt the user. For example, a task sequence may be for an exercise routine: 1) skip rope for 1 minute, 2) perform 15 jumping jacks, and 3) jog 1 mile; the user's wearable device might interrupt (e.g., vibrate, make a noise) after 1 minute of skipping rope.

The task monitoring program 110 may determine an acceptable level of deviation (e.g., delta) from the task sequence. The AI voice response system may be trained to determine the acceptable level of deviation from the task sequence automatically (e.g., observing users frequently deviate from a task sequence) and/or manually (e.g., user explaining the deviation from the task sequence was a preference). The task monitoring program 110 may interrupt the user if the deviation (e.g., delta) from the task sequence rises above a predefined threshold (e.g., task monitoring program 110 threshold, threshold set by user).

The task monitoring program 110 may preemptively interrupt the user. Preemptively interrupting the user may mean interrupting the user before the user has deviated from the task sequence. The task monitoring program 110 may determine the user is about to deviate from the task sequence based on similar deviations of other users.

At 216, the task monitoring program 110 may receive user feedback. The task monitoring program 110 may interpret the user feedback. Interpreting user feedback may include, but is not limited to including, determining the interruption was a mistake, determining the deviation from the task sequence may be an acceptable level of deviation (e.g., delta) from the task sequence, determining the deviation from the task sequence may be personal to the user.

The task monitoring program 110 may utilize the knowledge corpus to store user feedback. The task monitoring program 110 may utilize the knowledge corpus to store user feedback determining the interruption was a mistake. The task monitoring program 110 may utilize the knowledge corpus to store user feedback based on a determined acceptable level of deviation from the task sequence.

The user feedback may be personal to the user. A personal knowledge corpus may store tasks sequences the task monitoring program 110 determines to be personal to the user. For example, if the user feedback states the user is dairy free the task monitoring program 110 may store the modified task sequence in the personal knowledge corpus. The task monitoring program 110 may not interrupt the user for failing to perform a step in a task sequence that involves dairy in the future.

The user feedback may be stored in the personal knowledge corpus. The personal knowledge corpus may be feedback specific to the user. The personal knowledge corpus may be utilized to retrain the AI voice response system. User feedback stored in the personal knowledge corpus may include, but is not limited to including, user preferences, dietary restriction (e.g., dairy free), health limitations.

At 218, the task monitoring program may modify the task sequence based on the user feedback. The task monitoring program 110 may determine to modify a task sequence based on user feedback. The task monitoring program 110 may store a modified task sequence. The task monitoring program 110 may retrain the AI voice response system based on the modified task sequence.

The task monitoring program 110 may monitor the task based on the modified task sequence. The task monitoring program 110 may monitor the modified task sequence until the completion of the last step of the modified task sequence. The task monitoring program 110 may automatically cease monitoring the task upon completion of the last step of the modified task sequence. The task monitoring program 110 may utilize the AI voice response system to confirm the user has completed the last step of the modified task sequence.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
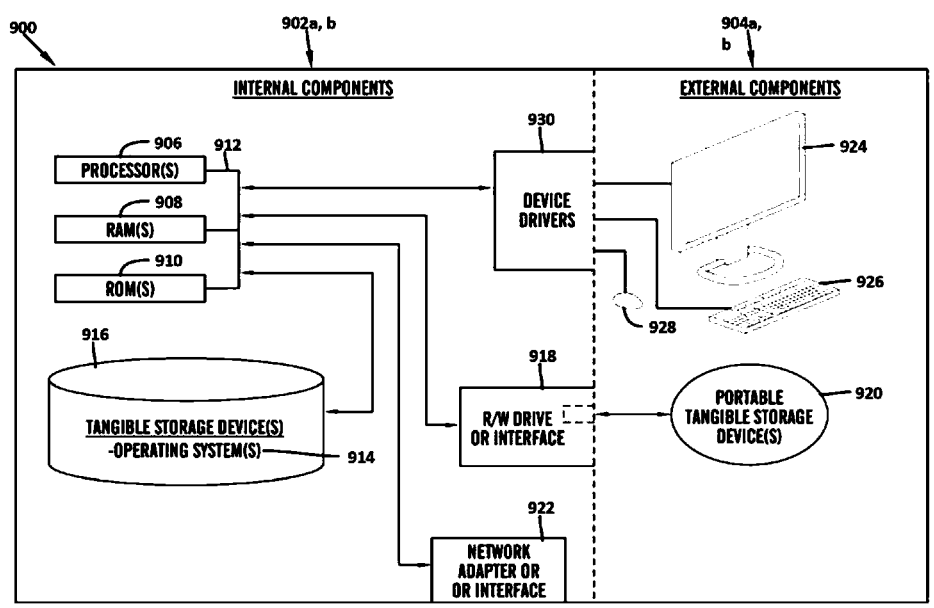
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the task monitoring program 110a in client computer 102, and the task monitoring program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the task monitoring program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the task program 110a in client computer 102 and the task monitoring program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the task monitoring program 110a in client computer 102 and the task monitoring program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
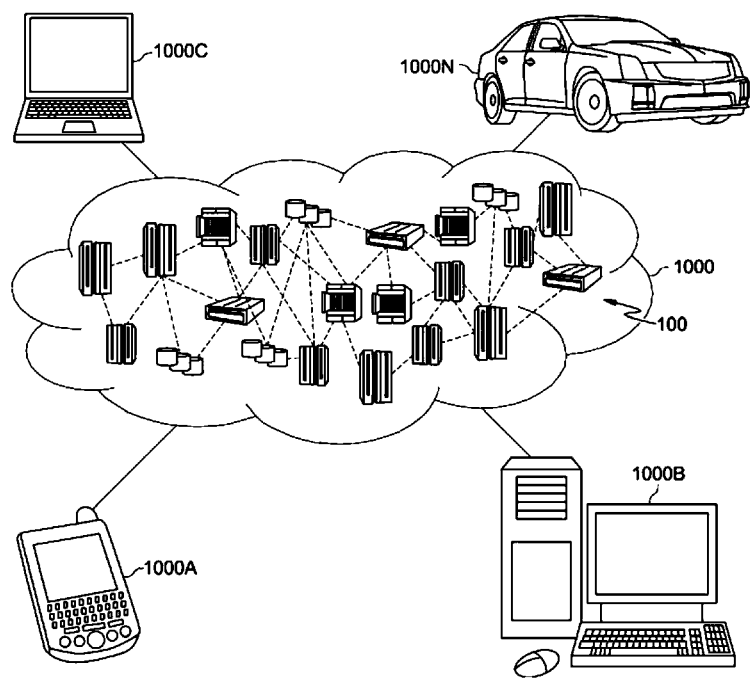
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
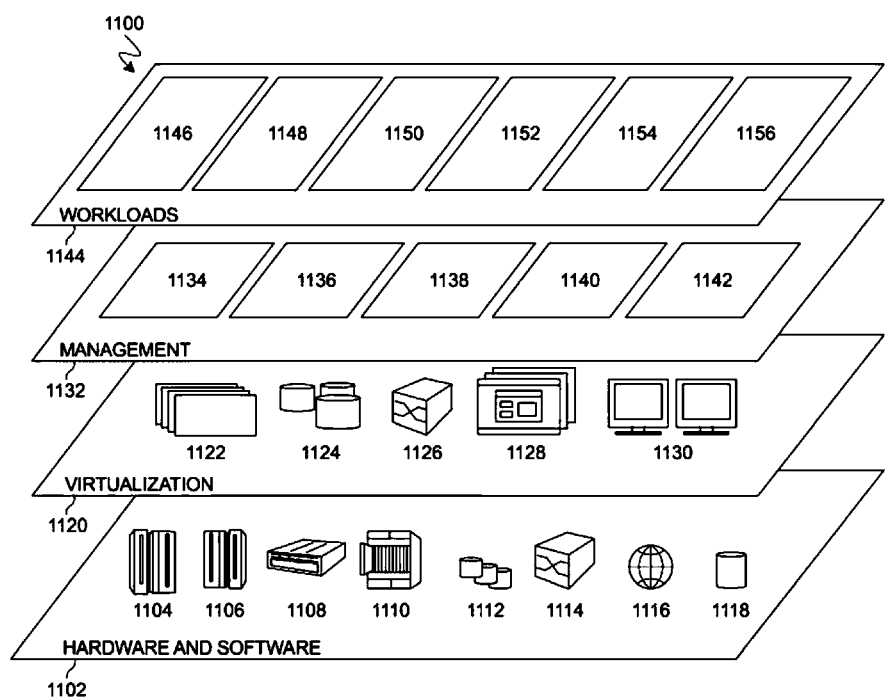
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and task monitoring 1156. A task monitoring program 110a, 110b provides a way to train an AI voice response system to actively monitor a task being performed by a user and interrupt if a difference is detected from a task sequence.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for task monitoring, the method comprising:
training an AI voice response system based on task performance data, wherein the task performance data originates from at least one monitoring device;
receiving a request for instructions to complete a task from a user;
monitoring a performance of the task by the user, wherein the performance of the task by the user is monitored utilizing the at least one monitoring device;
determining whether a deviation in the performance of the task by the user as compared to the task sequence rises above a predefined threshold by interpreting the task performance data received from the at least one monitoring device using the AI voice response system;
interrupting the user upon determining that the deviation rises above the predefined threshold, wherein the predefined threshold is established by training the AI voice response system to determine an acceptable level of deviation from the task sequence; and receiving user feedback; and generating a response to the user feedback, wherein generating the response involves modifying the task sequence, wherein the AI voice response system is retrained based on the modified task sequence not to interrupt the user for the deviation in task sequence in the future.

2. The method of claim 1, wherein the AI voice response system receives task performance data from the at least one monitoring device in real time.

3. The method of claim 1, wherein receiving the request for instructions to complete the task from the user further comprises:

processing the request for instructions to complete the task;

searching a knowledge corpus; and generating the task sequence, wherein the task sequence is a series of steps the user is to perform in order to complete the task.

4. The method of claim 3, wherein the task sequence correlates to an analyzed video.

5. The method of claim 1, wherein monitoring the performance of the task by the user further comprises:

utilizing a voice trigger command, no more than once to awaken the AI voice response system; and monitoring the task sequence until the task is complete.

6. The method of claim 1, wherein the modified task sequence is stored in a personal knowledge corpus.

7. A computer system for task monitoring, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

training an AI voice response system based on task performance data, wherein the task performance data originates from at least one monitoring device;

receiving a request for instructions to complete a task from a user;

monitoring a performance of the task by the user, wherein the performance of the task by the user is monitored utilizing the at least one monitoring device;

determining whether a deviation in the performance of the task by the user as compared to the task sequence rises above a predefined threshold by interpreting the task performance data received from the at least one monitoring device using the AI voice response system;

interrupting the user upon determining that the deviation rises above the predefined threshold, wherein the predefined threshold is established by training the AI voice response system to determine an acceptable level of deviation from the task sequence; and receiving user feedback; and generating a response to the user feedback, wherein generating the response involves modifying the task sequence, wherein the AI voice response system is retrained not to interrupt the user for the deviation in task sequence in the future.

8. The computer system of claim 7, wherein the AI voice response system receives the task performance data from the at least one monitoring device in real time.

9. The computer system of claim 7, wherein receiving the request for instructions to complete the task from the user further comprises:

processing the request for instructions to complete the task;

searching a knowledge corpus; and generating the task sequence, wherein the task sequence is a series of steps the user is to perform in order to complete the task.

10. The computer system of claim 9, wherein the task sequence correlates to an analyzed video.

11. The computer system of claim 7, wherein monitoring the performance of the task by the user further comprises:

utilizing a voice trigger command, no more than once to awaken the AI voice response system; and monitoring the task sequence until the task is complete.

12. The computer system of claim 7, wherein the modified task sequence is stored in a personal knowledge corpus.

13. A computer program product for task monitoring, comprising:

one or more non-transitory computer-readable storage media and program instructions stored on at least one of the one or more tangible storage media, the program instructions executable by a processor to cause the processor to perform a method comprising:

training an AI voice response system based on task performance data, wherein the task performance data originates from at least one monitoring device;

receiving a request for instructions to complete a task from a user;

monitoring a performance of the task by the user, wherein the performance of the task by the user is monitored utilizing the at least one monitoring device;

determining whether a deviation in the performance of the task by the user as compared to the task sequence rises above a predefined threshold by interpreting the task performance data received from the at least one monitoring device using the AI voice response system;

interrupting the user upon determining that the deviation rises above the predefined threshold, wherein the predefined threshold is established by training the AI voice response system to determine an acceptable level of deviation from the task sequence; and receiving user feedback; and generating a response to the user feedback, wherein generating the response involves modifying the task sequence, wherein the AI voice response system is retrained not to interrupt the user for the deviation in task sequence in the future.

14. The computer program product of claim 13, wherein the AI voice response system receives the task performance data from the at least one monitoring device in real time.

15. The computer program product of claim 13, wherein receiving the request for instructions to complete the task from the user further comprises:

processing the request for instructions to complete the task;

searching a knowledge corpus; and generating the task sequence, wherein the task sequence is a series of steps the user is to perform in order to complete the task.

16. The computer program product of claim 13, wherein monitoring the performance of the task by the user further comprises:

utilizing a voice trigger command, no more than once to awaken the AI voice response system; and monitoring the task sequence until the task is complete.

17. The computer program product of claim 13, wherein the modified task sequence is stored in a personal knowledge corpus.

* * * * *